July 9, 1929.  G. P. KIRCHNER  1,720,280
HINGE FOR CONVERTIBLE AUTOMOBILE SEATS
Filed Feb. 18, 1928
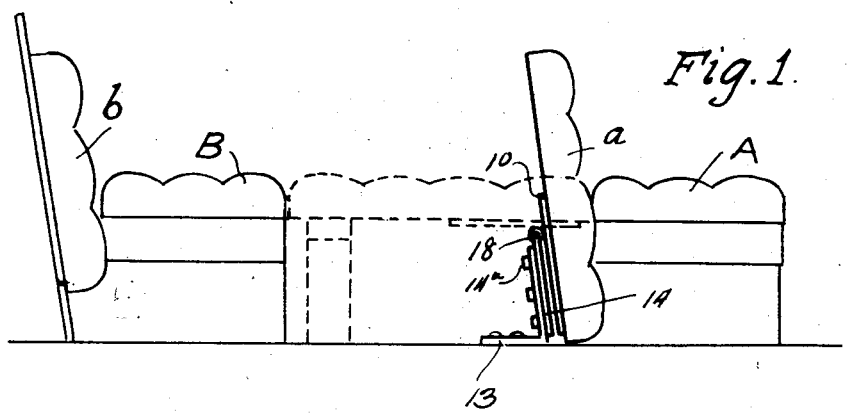
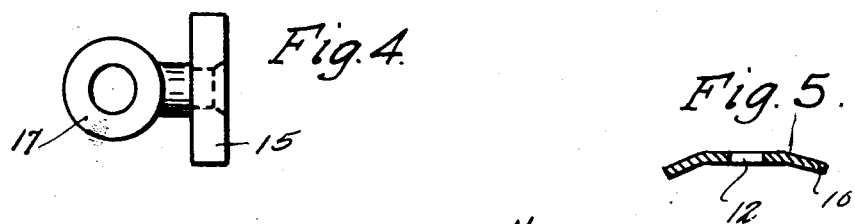
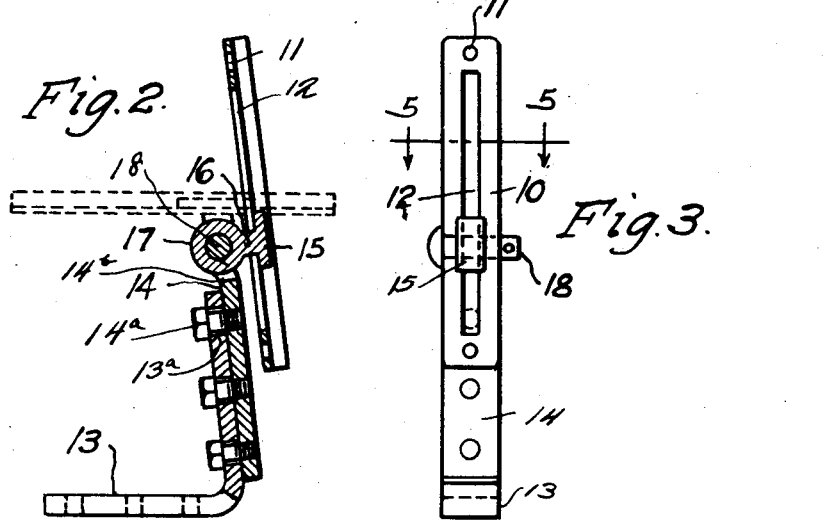
INVENTOR.
George P. Kirchner
BY Watson E. Coleman
ATTORNEY.

Patented July 9, 1929.

1,720,280

UNITED STATES PATENT OFFICE.

GEORGE P. KIRCHNER, OF DENVER, COLORADO.

HINGE FOR CONVERTIBLE AUTOMOBILE SEATS.

Application filed February 18, 1928. Serial No. 255,416.

This invention relates to seats for automobiles which are convertible into beds.

The general object of the present invention is to provide means whereby the back of the front seat of an automobile may be readily shifted and turned down into a horizontal position so as to form a bed with the front and back cushions of the automobile.

A further object is to provide an improved form of hinge readily attachable to the back of a front automobile seat and of such construction as to permit this back to be shifted bodily upward or bodily downward and turned toward or from a horizontal position.

Another object is to provide a hinge which will not mar the seat to which it is applied, which may be easily applied to the seat back, which will eliminate any necessity of cutting the seat away from the side on enclosed cars, and which is adjustable so that it may accommodate itself to any type of car now on the market.

Other objects will appear in the course of the following description.

My invention is illustrated in the accompanying drawing, wherein:—

Figure 1 is a side elevation showing a convertible automobile seat constructed in accordance with my invention;

Figure 2 is a vertical sectional view through the hinge connection;

Figure 3 is a front elevation of the hinge connection detached;

Figure 4 is a side elevation of the pivotal connection of the hinge sections;

Figure 5 is a section on the line 5—5 of Figure 3;

Referring to this drawing, A designates the front seat of an automobile and B the rear seat thereof. Associated with the front seat is the seat back or rear cushion $a$ and associated with the back seat B is the back or rear cushion $b$. The back seat and its cushion may be of any suitable type. The front seat may also be of any suitable type, but the back $a$ is mounted upon a hinge of such construction, as will be later described, that the back $a$ may be lifted bodily upward and then turned into a horizontal position or turned from a horizontal position to an approximately vertical position and then shifted bodily downward, as shown in Figure 1.

To this end, the back $a$ is upholstered from its upper to its lower end and this back is mounted upon a special hinge, shown in Figures 2, 3, 4 and 5. One leaf of this hinge comprises a plate 10 fastened at its ends by screws 11 to the back of the seat back $a$ and this plate is longitudinally slotted, as at 12. The second leaf 14 of this hinge is supported by an angular bracket 13 having one flange thereof resting upon and attached to the floor of the car and the other flange thereof provided with spaced perforations $13^a$ receiving securing elements $14^a$ engaging the leaf 14. By these securing elements a measure of adjustability as to the effective height of the leaf 14 may be obtained. The leaf 14 at its upper end is slotted, as indicated at $14^b$. Operating within the slot 12 is a slide 15, this slide having a shank 16 terminating in a disk-like member 17 disposed within the slot 14 and pivoted to the plate 14 by means of the transverse bolt or pin 18. It will be obvious that with this construction the hinge may be shifted longitudinally upon the slide 15 or the plate 10 may be turned upon the axis afforded by the pin 18.

In the use of this device, the normal position of the seat back $a$ for the front seat is as shown in Figure 1, but when this seat back is raised up and then turned into a horizontal position, the seat back will extend from the front seat to the rear seat, thereby forming a couch or bed. The rear end of the seat back $a$, when turned into a horizontal position, will, of course, rest upon any suitable support. It will be seen that the seating arrangement of a car need not be changed in any way except in so far as to mount the back of the front seat upon this hinge. The hinge is readily attached to the seat back by the use of the two screws 11 heretofore referred to.

The application of this device to a car requires no cutting of the seat away from the side on enclosed cars, and further the upright member or leg 13 is of such form that it will not interfere with the leg room of the rear passengers. A still further advantage is that the longitudinally extending slot 12 with the slide 15 permits the seat back to be adjusted forward or rearward, thus adapting it to different types of cars or to suit any other desired condition. When the seat is laid flat or in a horizontal position, the slot in the pivoted portion of the hinge permits of a lateral adjustment, which is a great advantage due to different positions of the seats in various automobiles.

While I have illustrated a particular embodiment of my invention, I do not wish to be limited thereto as it is obvious that it might be modified in many ways without departing from the spirit of the invention as defined in the appended claims.

I claim:—

1. As an article of manufacture, a hinge for automobile seat backs comprising a supporting member adapted to be attached to the floor of the automobile, a member hinged thereto at the upper end thereof for rotation around a horizontal axis, a plate having sliding engagement with said last named member and having means whereby it may be attached to the back of an automobile seat.

2. A hinge for supporting the backs of automobile seats comprising an angular support adapted to be attached to the floor of a car and extend upward therefrom, the support being bifurcated at its upper end, a disk-like member disposed in said bifurcation and hinged to the supporting member for movement around a horizontal axis, said disk-like member having an outwardly projecting shank and a slide carried thereby, and a longitudinally slotted plate and slide engaging in said slot in the plate, the plate having means whereby it may be attached to the back of an automobile seat.

In testimony whereof I hereunto affix my signature.

GEORGE P. KIRCHNER.